(12) United States Patent
Meyer

(10) Patent No.: US 7,342,513 B2
(45) Date of Patent: Mar. 11, 2008

(54) AIRCRAFT INTERIOR WIRELESS COMMUNICATIONS SYSTEM

(75) Inventor: Thomas J. Meyer, Pinellas Park, FL (US)

(73) Assignee: Goodrich Lighting Systems, Inc., Oldsmar, FL (US)

( * ) Notice: Subject to any disclaimer, the term of this patent is extended or adjusted under 35 U.S.C. 154(b) by 332 days.

(21) Appl. No.: 11/057,637

(22) Filed: Feb. 14, 2005

(65) Prior Publication Data

US 2005/0202785 A1  Sep. 15, 2005

Related U.S. Application Data

(60) Provisional application No. 60/544,445, filed on Feb. 13, 2004.

(51) Int. Cl.
*G08B 21/00* (2006.01)

(52) U.S. Cl. ............... 340/945; 340/572.7; 340/572.8; 340/539.16; 340/815.55; 340/815.76

(58) Field of Classification Search ............... None
See application file for complete search history.

(56) References Cited

U.S. PATENT DOCUMENTS

| | | | | |
|---|---|---|---|---|
| 4,898,789 A * | 2/1990 | Finley | ............... | 428/623 |
| 5,463,595 A * | 10/1995 | Rodhall et al. | ............... | 367/93 |
| 5,497,161 A * | 3/1996 | Tsui | ............... | 342/147 |
| 5,621,798 A * | 4/1997 | Aucsmith | ............... | 380/271 |
| 5,755,505 A * | 5/1998 | Hiramatsu | ............... | 362/581 |
| 5,809,405 A * | 9/1998 | Yamaura | ............... | 455/101 |
| 5,882,108 A * | 3/1999 | Fraizer | ............... | 362/293 |
| 6,150,961 A * | 11/2000 | Alewine et al. | ............... | 340/995.1 |
| 6,225,954 B1 * | 5/2001 | Edvardsson et al. | ............... | 343/713 |
| 6,380,883 B1 * | 4/2002 | Bell et al. | ............... | 342/70 |
| 6,754,602 B1 * | 6/2004 | Tkachenko et al. | ............... | 702/108 |
| 6,788,256 B2 * | 9/2004 | Hollister | ............... | 343/700 MS |
| 6,972,682 B2 * | 12/2005 | Lareau et al. | ............... | 340/568.1 |
| 7,019,618 B2 * | 3/2006 | Pratt et al. | ............... | 340/10.2 |

* cited by examiner

*Primary Examiner*—Benjamin C. Lee
*Assistant Examiner*—Son Tang
(74) *Attorney, Agent, or Firm*—Renner, Otto, Boisselle & Sklar, LLP

(57) ABSTRACT

A wireless communications system suitable for use within an aircraft, such as a part of a wireless emergency lighting system (WELS) is provided. In an aircraft, EXIT signs are located throughout the interior of the aircraft, including the ceiling (general illumination), seats (floor proximity) and EXIT doors (locator/identifier). A wireless communications system uses an integrated lens antenna system that takes advantage of the quantity and location of emergency lights such that any given light will have a direct radio frequency (RF) path to several other lights. A virtual network can be created such that if the path between any two lights becomes disrupted, alternate paths will be constructed under software control.

21 Claims, 10 Drawing Sheets

Characteristic impedance of microstrip line: wide-strip approximation (*left*); narrow-strip approximation (*right*)

AIRCRAFT INTERIOR WIRELESS COMMUNICATIONS SYSTEM

RELATED APPLICATION DATA

This application claims the benefit of U.S. Provisional Application No. 60/544,445, filed Feb. 13, 2004, which is incorporated herein by reference in its entirety.

TECHNICAL FIELD

The invention herein described relates generally to wireless communications systems and, more particularly, to a wireless communications system for the interior of an aircraft.

BACKGROUND OF THE INVENTION

In many commercial settings, wireless networks have replaced the standard "hard wired" Ethernet network. For example, the Institute of Electrical and Electronic Engineers, the "IEEE", 802.11 standard for wireless networking has been widely accepted. Manufacturers of a wide variety of products now offer many 802.11-compliant products for wireless networking. Wireless networks offer the advantage of accommodating moderately-sized numbers of users per radio frequency channel. As another example, the IEEE 802.15.4 standard defines the protocol and compatible interconnection for data communication devices using low data rate, low power and low complexity, short-range radio frequency (RF) transmissions in a wireless personal area network (WPAN).

The recognized economies of wireless networks and communications systems have made them an attractive vehicle for distribution or communication of data in environments where individual wires are cumbersome. An airplane cabin is such an environment.

While there is a need for wireless communications systems within aircraft, integrating wireless communications systems within aircraft provides a unique set of challenges. First, the interior of an aircraft is a poor medium for radio frequency (RF) radiation due at least in part to the fact that it is non-uniform and dynamic because of passenger and/or luggage movement. Also, the already-limited spectral bandwidth is shrinking with the development of new technology devices. In addition, any on-aircraft wireless system must not interfere with other aircraft navigation and communications systems.

SUMMARY OF THE INVENTION

The present invention provides a wireless communications system suitable for use within an aircraft, such as a part of a wireless emergency lighting system (WELS). In an aircraft, EXIT signs are located throughout the interior of the aircraft, including the ceiling (general illumination), seats (floor proximity) and EXIT doors (locator/identifier). The present invention provides a wireless communications system using an integrated lens antenna system that takes advantage of the quantity and location of emergency lights such that any given light will have a direct radio frequency (RF) path to several other lights. A virtual network can be created such that if the path between any two lights becomes disrupted, alternate paths will be constructed under software control.

According to one aspect of the invention, there is provided a wireless emergency lighting system (WELS) for an aircraft interior. The system includes a plurality of light assemblies locatable throughout the aircraft interior, each of the plurality of light assemblies including at least one wireless communication device. A WELS controller communicates wirelessly with one or more of the plurality of light assemblies.

According to another aspect of the invention, there is provided a lighting device. The device includes a housing, one or more light generating elements mounted to the housing, and a wireless communication device mounted to the housing.

According to another aspect of the invention, there is provided a wireless communications system for an aircraft interior. The system includes a plurality of devices locatable throughout the aircraft interior, each of the plurality of devices including at least one wireless communication device. A controller is in wireless communication with one or more of the plurality of devices. The controller communicates with a given device along a given wireless communications path, and the controller changes the wireless communications path between the controller and the given device in response to a disruption between two devices along the given wireless communications path.

The foregoing and other features of the invention are hereinafter more fully described and particularly pointed out in the claims, the following description and the annexed drawings setting forth in detail illustrative embodiments of the invention, such being indicative, however, of but a few of the various ways in which the principles of the invention may be employed.

BRIEF DESCRIPTION OF THE DRAWINGS

These and further features of the present invention will be apparent with reference to the following description and drawings, wherein.

DETAILED DESCRIPTION

Figure 1:
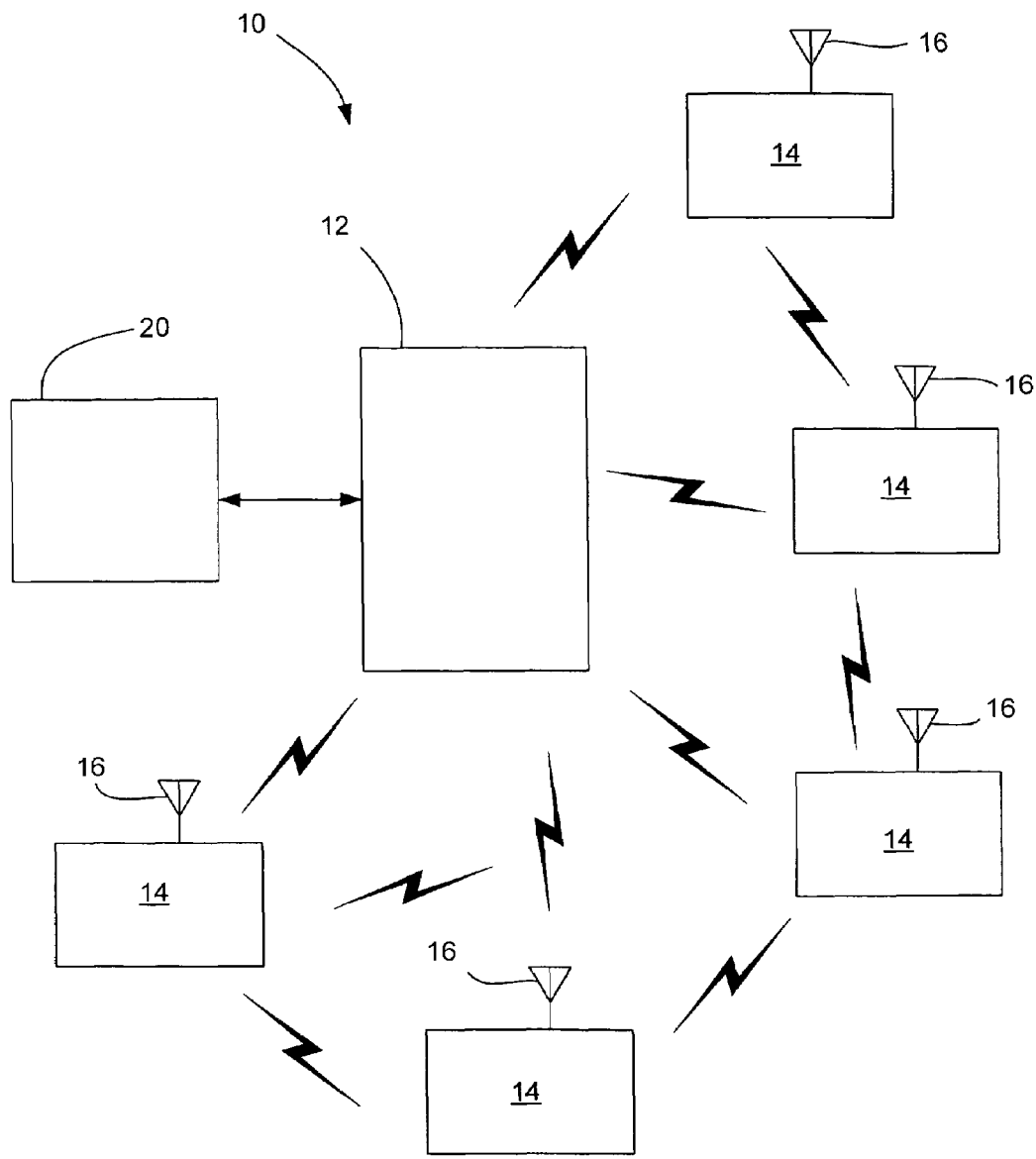
FIG. 1 is a diagrammatic illustration of a wireless emergency lighting system (WELS) in accordance with the present invention.

Referring now in detail to the drawings, wherein like reference numerals designate like or corresponding parts throughout the several views, and with reference to FIG. 1, there is shown a wireless communications system 10, such as a wireless emergency lighting system (WELS) for an aircraft. In the illustrated embodiment, the system 10 includes a WELS controller 12 in radio frequency (RF) wireless communication with a plurality of light assemblies 14, such as interior aircraft emergency lights, via one or more RF antennas 16 integrated into each light assembly 14. Any given light assembly 14 has a direct RF path to several other light assemblies. As is described more fully below, the controller 12 and light assemblies 14 can operate as a "virtual network" such that if the path between any two light assemblies becomes disrupted, alternate paths will be constructed under software control. The WELS 10 is in data communication, e.g., non-wireless communication, with a main communications system or controller 20, such as a cabin services communications system (CSCS).

Although the present invention is being shown and described with respect to a wireless emergency lighting system (WELS) within an aircraft, it should be appreciated that the invention is applicable to other wireless communications systems within an aircraft, including, but not limited to in-flight entertainment (IFES), internet and cell phone connectivity, and aircraft systems. Further, the present invention is applicable to other environments besides the interior of an aircraft. For example, the present invention is applicable to other interior environments or spaces where a number of indicators, such as lights or signs, are disposed in relatively fixed positions about a space, such as a room. The present invention also is applicable in connection with changing electromagnetic environments.

Figure 2:
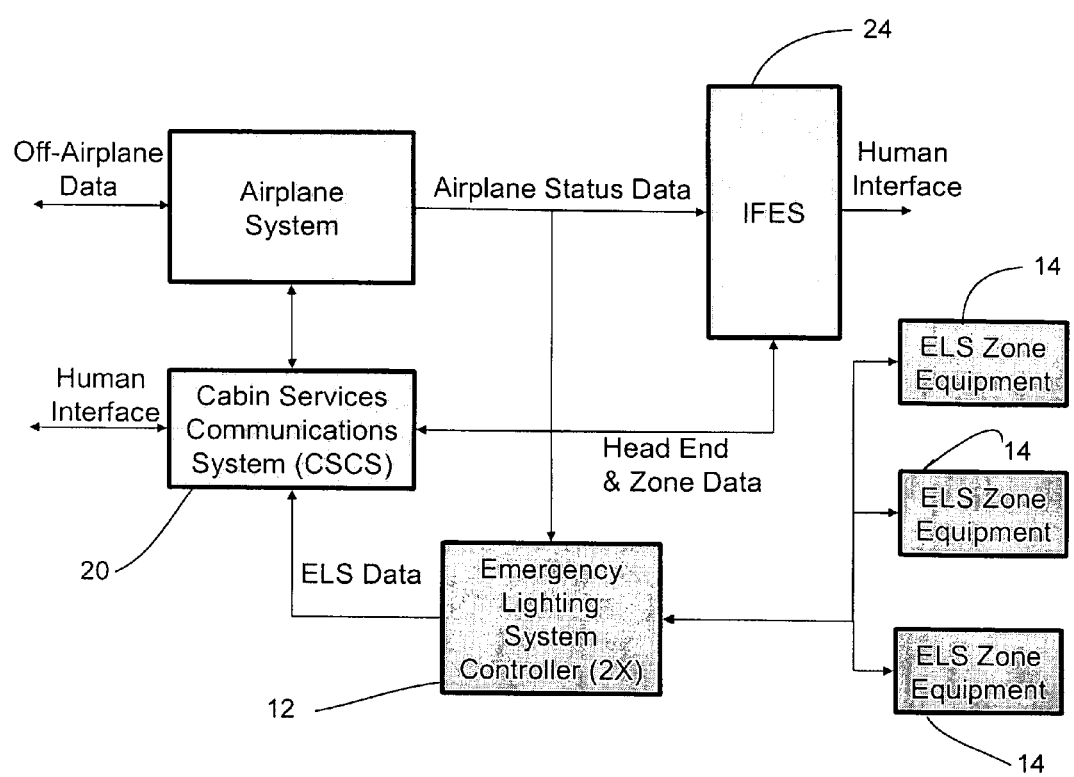
FIG. 2 is a diagrammatic illustration of the interface between the WELS and the aircraft system communications in accordance with the present invention.

In a commercial aircraft embodiment, FIG. 2 schematically illustrates the interface between the WELS and the aircraft system communications. The commercial aircraft can employ a cabin services communications system (CSCS) 20 that interfaces with the in-flight entertainment system (IFES) 24 as well as other aircraft systems. The WELS controller 12 acts as a bridge between these aircraft systems and all network elements 14, e.g., emergency lights. The WELS controller 12 communicates to the other aircraft systems and to the emergency lights 14 as is described more fully below. The WELS communications may employ, for example, IEEE 802.15.4 (or similar) configuration and interface with other aircraft systems by, for example, RS-485 (or other non-wireless) means.

Figure 3:
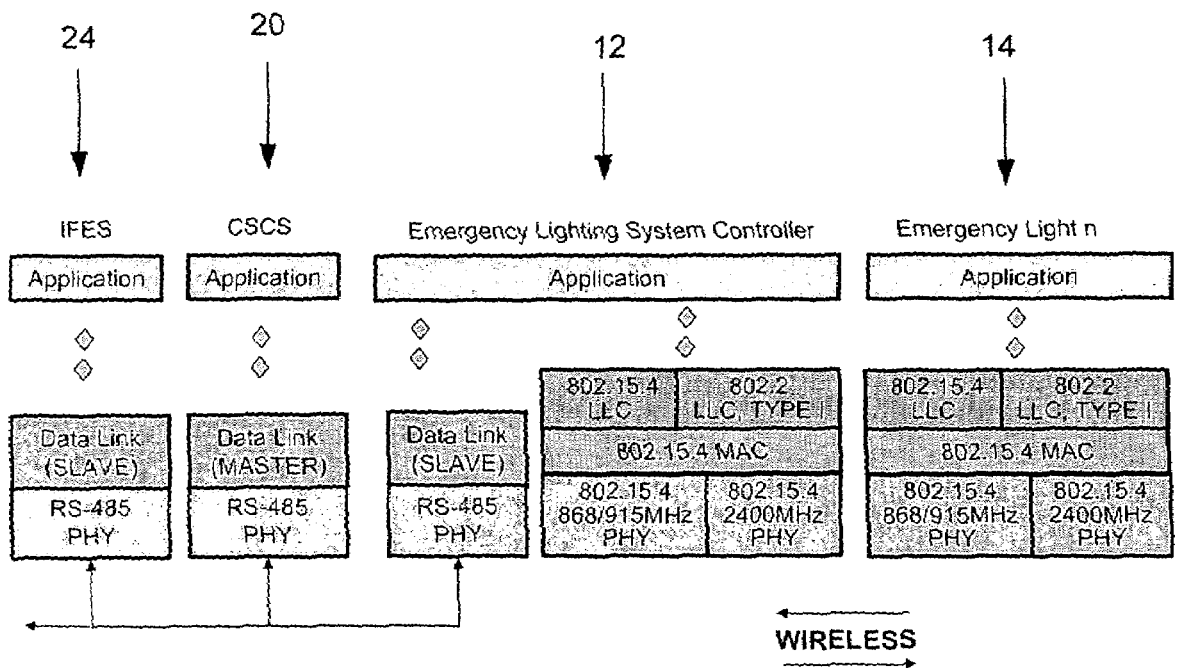
FIG. 3 is a diagrammatic illustration of an International Organization for Standardization (ISO) communication model for WELS interface to aircraft system communications in accordance with the present invention.

The interface of the WELS to the CSCS and airplane status provides WELS system control modes ON/ARM/OFF, implements in-flight lockout based on airplane status and allows system interrogation/maintenance information (BITE) via the CSCS display panel. Actuations of these functions are embedded in the WELS logic/control and remain transparent to the user. Interface between the two systems can conform to various data interface implementation requirements. The illustrated embodiment is described below in Table 1. FIG. 3 illustrates the International Organization of Standardization (ISO) equivalent model for this interface.

TABLE 1

WELS/CABIN COMMUNICATION SYSTEM
Interface Signal Configuration

| Interface Signal | Signal source | Signal Destination | Interface Design |
|---|---|---|---|
| ON | CSCS | WELS Controller | 485H |
| ARM | CSCS | WELS Controller | 485H |
| OFF | CSCS | WELS Controller | 485H |
| Sys Validation | CSCS | WELS Controller | 485H |
| Flight Phase | Airplane Systems/CSCS | WELS Controller | 485H |
| Air Speed | Airplane Systems/CSCS | WELS Controller | 485H |
| Radio Altitude | Airplane Systems/CSCS | WELS Controller | 485H |
| a/p Validation | Airplane Systems/CSCS | WELS Controller | 485H |
| A/G | Airplane Systems/CSCS | WELS Controller | 485H |
| Healthcheck | WELS Controller | Remote Loads | 802.15.4 |
| ON Command | WELS Controller | Remote Loads | 802.15.4 |
| ARM Command | WELS Controller | Remote Loads | 802.15.4 |
| OFF Command | WELS Controller | Remote Loads | 802.15.4 |
| Initialization | WELS Controller | Remote Loads | 802.15.4 |
| Identification (P/N, S/N) | Remote Loads | WELS Controller | 802.15.4 |
| Status (ON/OFF/ARMED) | Remote Loads | WELS Controller | 802.15.4 |
| PS BITE | Remote Loads | WELS Controller | 802.15.4 |
| Battery BITE | Remote Loads | WELS Controller | 802.15.4 |
| Light BITE | Remote Loads | WELS Controller | 802.15.4 |

This arrangement provides direct control of the WELS from the flight deck or attendant switches and allows maintenance operations to be performed directly via the maintenance display panel in human readable form. These maintenance functions can include: (1) system initialization (for adding/replacing or reconfiguring network elements); (2) system status (ON/ARM/OFF) report by network element; (3) request/receipt of BITE; and (4) direct (ON/ARM/OFF) mode control of individual network elements.

The interface configuration definition for WELS should include, for each logical address, at a minimum (1) device type (e.g., general illumination, floor proximity, identifier, DS locator, SS locator or marker); (2) on-aircraft location (e.g., PAX 1LH); (3) part number (P/N); and (4) serial number (S/N). Other than the on aircraft location, each device can be self-configured at the time of assembly by means of downloaded firmware and verified by means of Acceptance Test Procedure (ATP).

Figure 4:
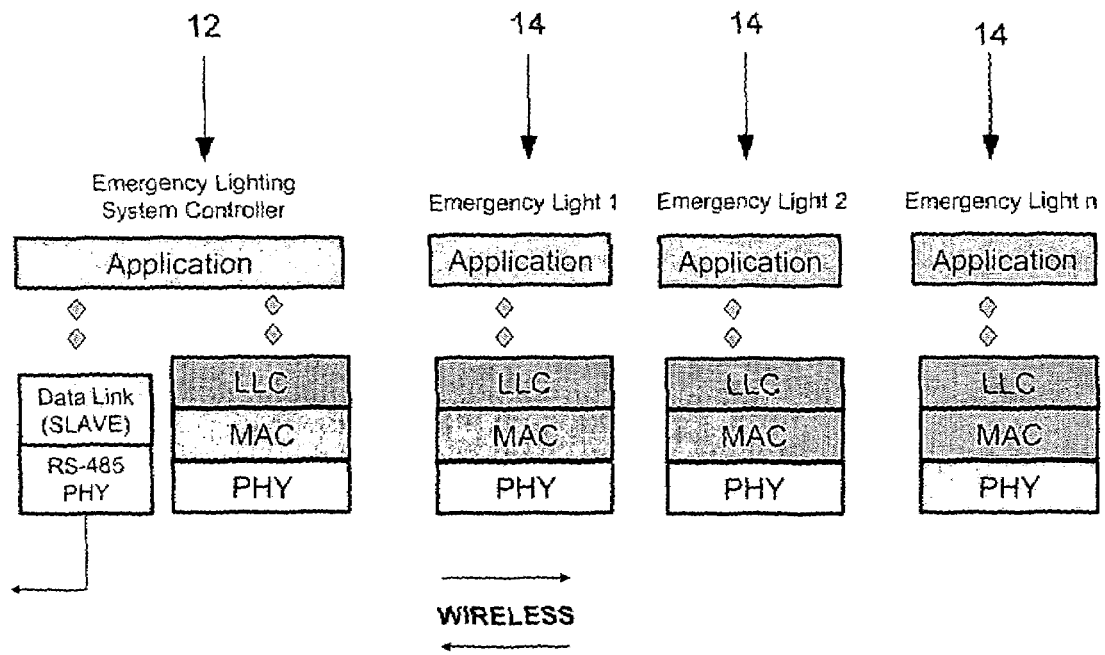
FIG. 4 is a diagrammatic illustration of an ISO communication model for WELS emergency lights in accordance with the present invention.

One of the more critical functions of the WELS controller 12 is to establish and maintain communications with all network elements at all times. A more difficult challenge is to re-establish communications once it has been lost. The design described herein uses Wide Band RF modulation for its wireless links. The modulation scheme conforms to IEEE 802.15.4 (as illustrated in FIG. 4). IEEE 802.15.4 is hereby incorporated by reference in its entirety. One key benefit of this approach is that for low data rates (e.g., 20 kb/s) and peer-to-peer configurations, location (distance) information can be extracted from the transmission via time difference of arrival (TDOA) methods. Location of objects in the WELS system is important for several reasons. Different cabin configurations prescribed by aircraft purchasers redefine some emergency light locations. By way of example, a more serious need to reconfigure communications paths may occur with cabin separation, such as in a crash situation. In this case, the device locations may not be at all what they were. As is described more fully below, by employing distributed energy sources (e.g., batteries), the WELS system allows communication and system operation while physically disconnected from the aircraft electrical system.

Generally, TDOA is useful in forming "ad-hoc" networks where objects may join the communications or move from one network to the other. In WELS aircraft cabin communications, however, the objects (once installed) remain stationary. In this case, it is the electric field patterns that may change dynamically with passenger (absorber) or luggage (absorber/reflector) configurations. To overcome changes in field patterns, the WELS controller must create a 'virtual network' consisting of all objects and their relative locations to one another. Owing to the peer-to-peer network structure and the use of 'smart' multi-directional antennas, messages can be routed or re-routed adaptively to match optimum field conditions within the cabin environment.

The aircraft structure itself defines the EXIT locations that can be considered "permanent"; each EXIT location is populated with a requisite compliment of lights. These light locations can serve as references for other light locations. Overhead cabin emergency lights (general illumination) can be less permanent with respect to location depending on configuration. Nevertheless, in order to meet FAR 25.812, these lights will be distributed throughout the aircraft. Monument mounted EXIT locators and floor proximity lights have the least definite locations. In one embodiment, there may be interest in making the monument signs movable. For example, monument signs can be used as class dividers. If an operator wishes to increase seating in one class over another, the class divider (e.g., EXIT sign and all) can be moved without disturbing the aircraft wiring and/or communications system.

Relying on the relatively fixed EXIT door and overhead cabin lighting locations, the virtual network mapping ensures that the signal paths (and levels) can be made short and that several signal routes are available to any location. For example, a message can be routed to a seat mounted (floor proximity light) via a plurality of different routes. These routes invoke other WELS objects such as EXIT locators or general illumination lights to convey the messages until a response from the target object is obtained.

Establishing the virtual network is accomplished by an initialization procedure. Starting with the "permanent" EXIT door location lighting components, the WELS controller 12 builds the network by adding the general illumination lights, locator lights until finally the floor proximity lights. As each object is added to the network, configuration information from the object (e.g., function, P/N, S/N ... etc.) is stored and maintained as tags for each logical address by the WELS controller.

Figure 5A:
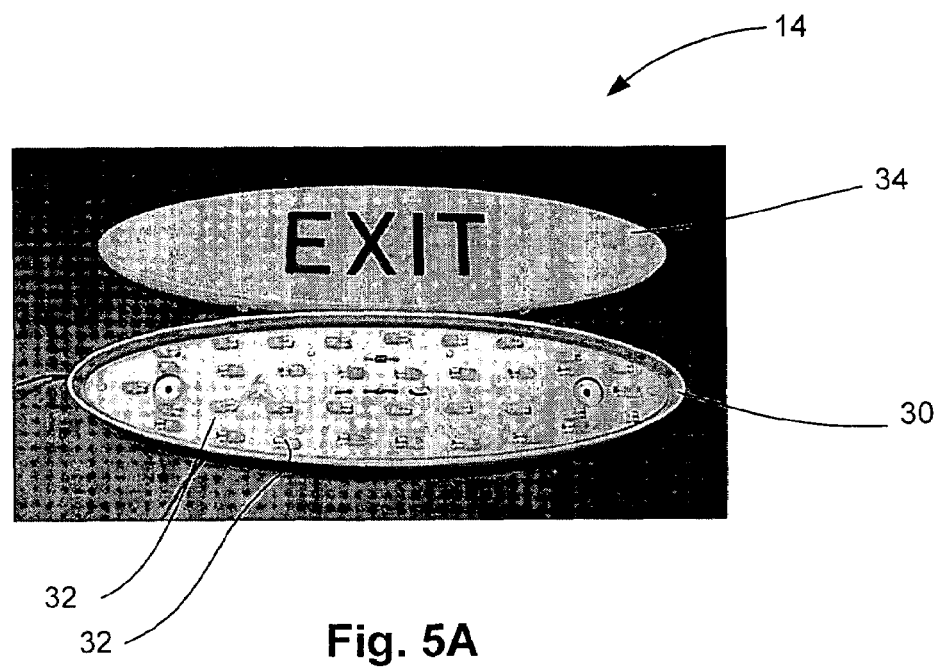
FIG. 5A is a top view of an exemplary lighting assembly in accordance with the present invention.
Figure 5B:
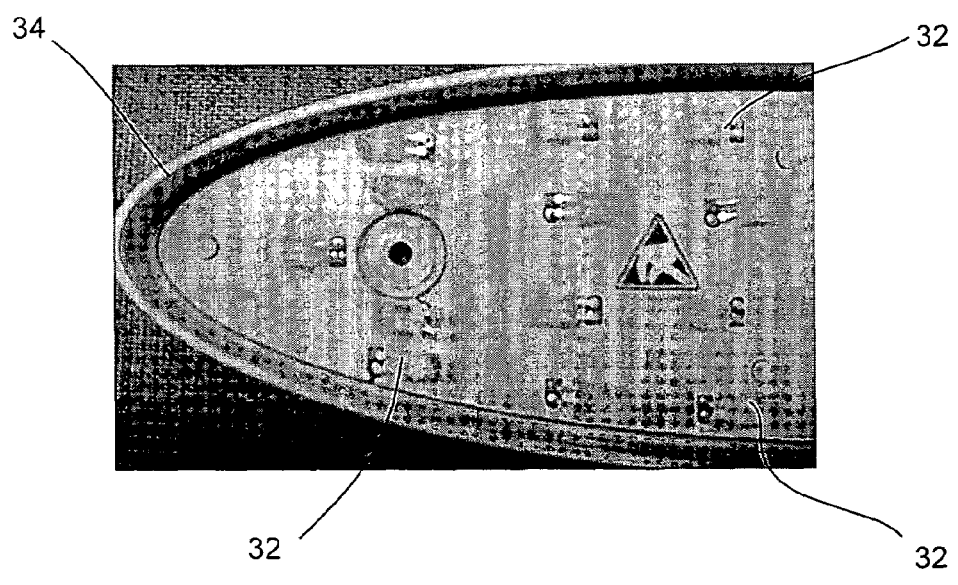
FIG. 5B is an enlarged view of a portion of the exemplary lighting assembly shown in FIG. 5A.

Referring now to FIGS. 5A and 5B, an exemplary lighting assembly 14 is illustrated. The illustrated lighting assembly is an EXIT marker having a housing 30, e.g., a housing made of aluminum, and one or more light generating elements 32 within the housing 30. In a preferred embodiment, the light generating elements are light emitting diodes (LEDs), and, preferably, white LEDs. Of course, other types of LEDs and other types of light generating elements can be employed without departing from the scope of the present invention. The lighting assembly 14 includes a lens 34 that is removably fastened to the housing using any suitable fastener, such as snap hooks or the like. As is described more fully below, the lens is made of a translucent dielectric material that is suitable for supporting an integral antenna therein or thereon.

The WELS system, operating on aircraft in the presence of many intentional and unintentional electromagnetic interference (EMI) emitters, depends heavily on antenna performance. For example, microwave ovens represent a serious challenge for 802.15.4 systems. Likewise, the WELS antenna design must insure that the radiated EMI fields do not interfere with flight critical instruments, which are sensitive to EMI emissions.

The integrated antenna design herein described represents a significant advance in the state of the art for aircraft cabin wireless communication systems. The antenna system is energy efficient, directional and can ideally be made adaptive to a changing electromagnetic environment. For example, antenna diversity (i.e., adaptability to changing environment) can be achieved by switching between polarization states (e.g., horizontal and vertical). In one embodiment, this can be accomplished by switching between two antenna elements in the antenna design. This diversity can be enough to overcome losses due to fade or multi-path.

Since the WELS includes the emergency lights, and each light has a lens of significant size, an antenna can be incorporated directly into the lens. Incorporating the antenna into or onto the lens provides high system performance with no appreciable added weight or volume to the overall system design. In addition, incorporation of the antenna is unobtrusive (e.g., substantially invisible) to the eye, so as to preserve the integrity of the sign and the information contained thereon. As discussed above, it should be appreciated that the antenna design described herein may be applied to other wireless communications systems within an aircraft including in-flight entertainment (IFES), Internet and cell phone connectivity as well as aircraft systems.

Generally, many low power radio frequency applications suffer from compact antenna design because a small form factor is required. For these applications, even one-quarter wavelength ($\frac{1}{4}\lambda$) elements are impractical resulting in capacitive transmitter loading with the real part of the antenna impedance around 50 Ohms.

Preferably, the antenna design is tuned to the transmitter (matched) for power efficiency (thereby providing a more desirable voltage standing wave ratio (VSWR)) and has defined directional lobes to further reduce output power requirements. The lobes provide directional performance that may be used to adapt to changing field conditions in the cabin. The directionality of the antenna is used to alter (re-route) messaging between WELS components in the peer-to-peer environment. Another advantage to the directional antenna approach is that it limits exposure to non-WELS emitters (interferers).

The WELS, aside from the low power benefit, has the advantage of high noise immunity. A challenge, however, for the antenna is that is must be broadband (e.g., log-periodic) for best performance. Wavelengths in the 802.15.4 spectrum are in the order of 15 cm. The antenna design herein described will provide not only ¼λ elements, but for some channels in the 802.15.4 spectrum, one-half wavelength (½λ) sections are possible. The result of this design is lower input power with higher efficiency.

In one embodiment, an antenna is integrated into each lighting assembly using strip-line techniques in combination with lens coating. This method allows more complex antenna designs having several elements to improve the antenna directivity and gain and, with the coating method described, the antenna designs and accompanying elements are virtually transparent to the eye. "Strip" and "micro-strip" are methods by which RF circuit elements can be constructed onto a dielectric material.

"Strip" transmission lines consist of a printed conductor placed between two ground planes and separated by a dielectric material, while micro-strip transmission lines use a similar configuration, but have only one ground plane. For micro-strip, wave propagation takes place partially in the dielectric medium and partially in the free space above (air) the dielectric. The characteristic impedance and wave velocity, therefore, take on values that lie between those that would normally occur for either the dielectric or the free space. Micro-strip antennas ("patches") have been used in cell phones primarily because of the small sizes that are achievable (these are generally made using flex circuit processes).

By combining the micro-strip transmission line techniques and lens coating process, it is possible to apply a conductive, substantially translucent coating to EXIT sign or overhead cabin light lenses in the form of a conductive antenna pattern without disturbing the appearance of the sign or light itself. The lens can be made of glass or any other suitable translucent dielectric material (composite) as long as it remains electrically and dimensionally stable.

In one embodiment, the back surface of the lens is coated with a conductive, substantially translucent coating, such as Indium-Tin-Oxide (ITO). Other suitable conductive coatings (e.g., conductive coatings that, when applied, are virtually transparent to the eye) can be employed and applied using suitable techniques, such as silkscreen and lithography. The mechanics of applying such coatings is known generally and, therefore, will not be described in great detail. The ITO coating is virtually transparent (approximately 85% transmission). Thus, coating the back surface of the lens for an interior light does not appreciably impact the light transmitted through it. It will be appreciated that uniformly coating the back side of the lens provides a "ground plane." The front side of the lens will be patterned with a similar conductive, substantially translucent coating (e.g., ITO) in the shape of any desired antenna geometry (e.g., monopole, dipole, Yagi, log-periodic, horn, spiral, and the like) needed to achieve the gain and directivity needed to meet the WELS communications requirements.

Figure 6A:
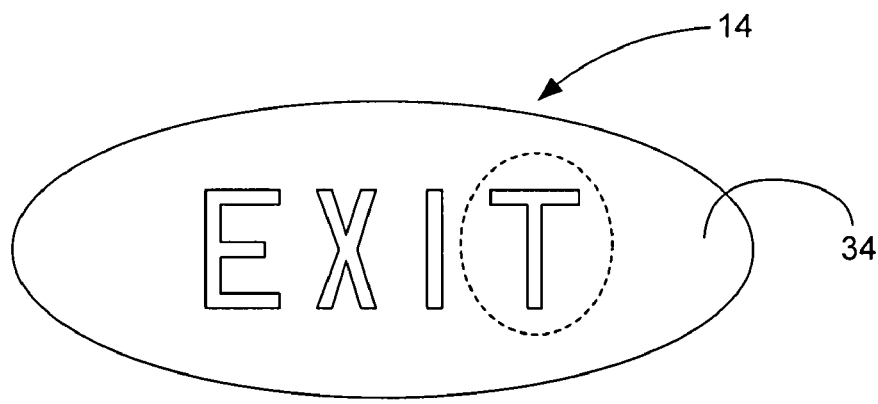
FIG. 6A is a top view of an exemplary lighting assembly in accordance with the present invention.
Figure 6B:
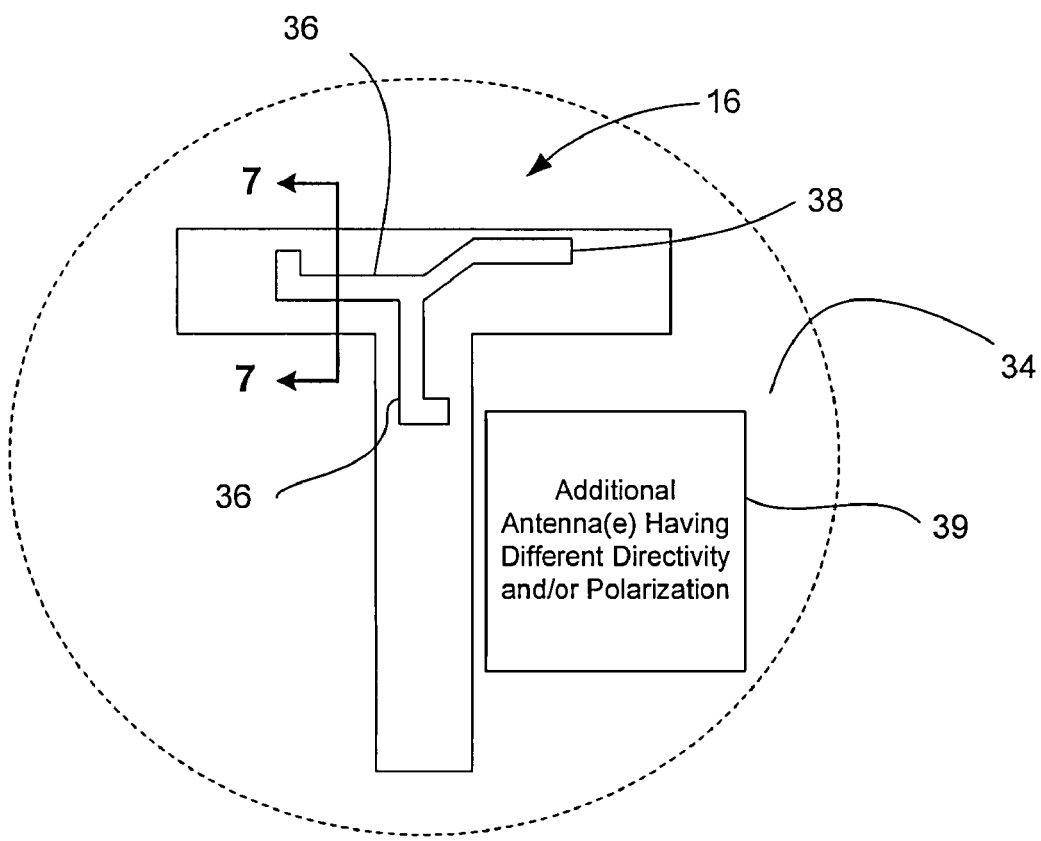
FIG. 6B is an enlarged view of a portion of the exemplary lighting assembly shown in FIG. 6A including an integral micro-strip antenna.
Figure 7:
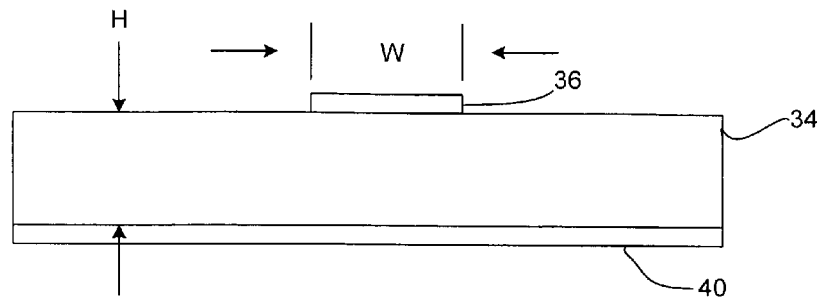
FIG. 7 is a sectional view of FIG. 6B taken along 7-7.

Referring now to FIGS. 6A and 6B and FIG. 7, an exemplary lighting assembly 14 having a lens 34 is provided. FIG. 6B shows an enlarged view of the front surface of a lens 34 on which a conductive antenna pattern 16 (in the illustrated embodiment, a dipole antenna pattern) has been formed. By way of example, this dipole pattern includes two ¼λ dipoles 36 oriented orthogonally to one another and a transmission line 38. Also, the lens 34 may include one or more antenna(e) 39 having different directivity and/or polarization. FIG. 7 provides a sectional view illustrating the dielectric lens 34 having a conductive ground plane 40 on its back surface and an antenna pattern 36 on its front surface.

Figure 8:
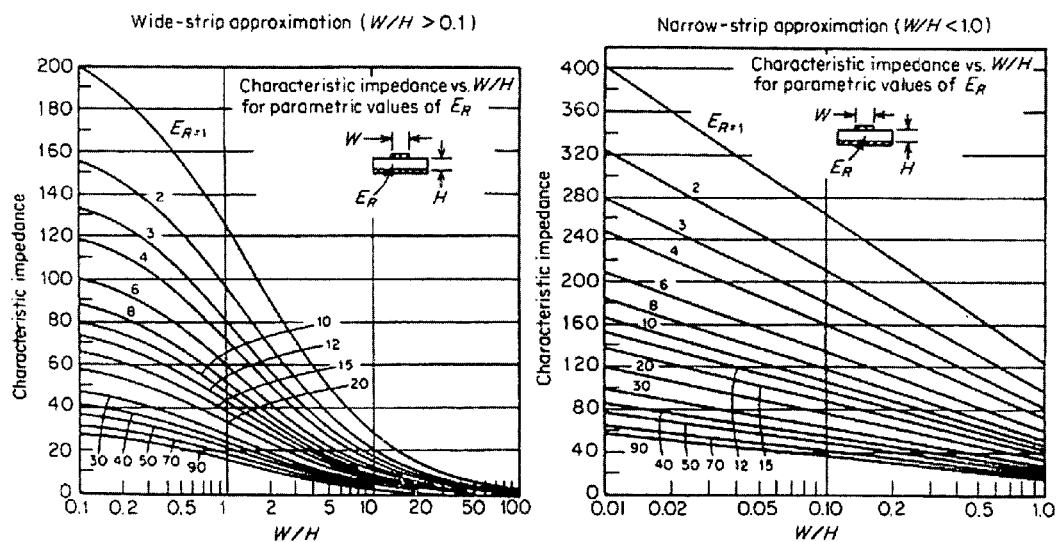
FIG. 8 includes exemplary plots of characteristic impedance as a function of dielectric and micro-strip dimensions for use in designing integrated antennas in accordance with the present invention.

In order to maintain low standing wave ratio (SWR), the transmission line 38 system is matched to the best extent possible. To do so, the characteristic impedance of the line needs to match the antenna impedance as well as the driver output impedance. In this manner, the micro-strip line will be matched regardless of its length. The length of the lines, measured in ¼λ, is established by the operating frequency range of interest. The relationship between the line dimensions, dielectric thickness and the dielectric constant of the medium will determine the characteristic impedance of the transmission line. Once the dielectric material and its thickness are chosen, the width of the primary conductor (actually width-to-height (W/H) ratio) can be found mathematically or parametrically as represented in the exemplary charts provided in FIG. 8. As is discussed more fully below, each lens can include multiple antennas to accomplish desired directivity and/or frequency modulation.

In an alternative embodiment, the integrated antenna can be formed using a fine wire embedded in the lens of a light forming simple antenna designs (e.g. whip, loop, spiral, dipole, folded dipole and the like). This method to embed antennas in dielectric media is commonly used in automotive windshields. To remain inconspicuous, the wire used must be very fine. The conductive coating and embedded wire techniques can be applied to the lenses of aircraft interior lights, establishing a network of wireless communications devices. The wire path, generally, makes a single continuous path coplanar with the dielectric (glass) lens.

In the above-described embodiments, it is to be appreciated that the antennae and/or their associated circuitry (e.g., transmitters, receivers, logic circuitry, switching elements, and the like) can be mounted or otherwise carried directly on the housing, within the housing or on the lens connected to the housing.

While the present invention is being shown and described with respect to wireless devices and systems, including RF antenna devices mounted or carried by each lighting assembly, it is to be appreciated that the lighting assemblies can include other wireless communications technology mounted on or in each lighting assembly. For example, optical wireless devices, such as infrared devices may be employed where the lighting assemblies include cooperative emitters and detectors for wirelessly transmitting information. These optical wireless devices, including their associated circuitry, can be mounted or otherwise carried, without limitation, directly on the housing, within the housing or on the lens connected to the housing.

Figure 9:
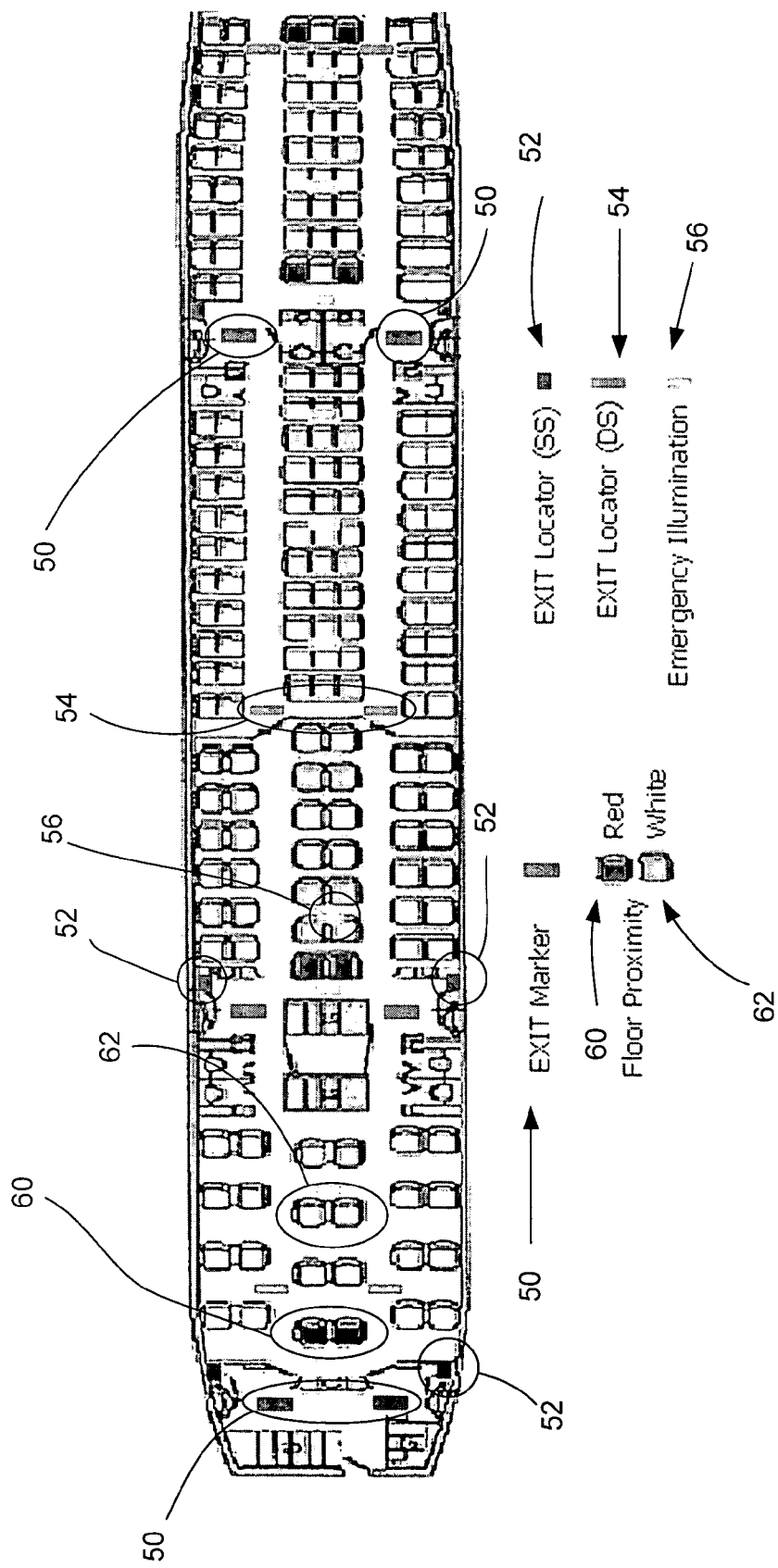
FIG. 9 is a top view of an exemplary aircraft layout with locations of WELS lighting components identified.
Figure 10:
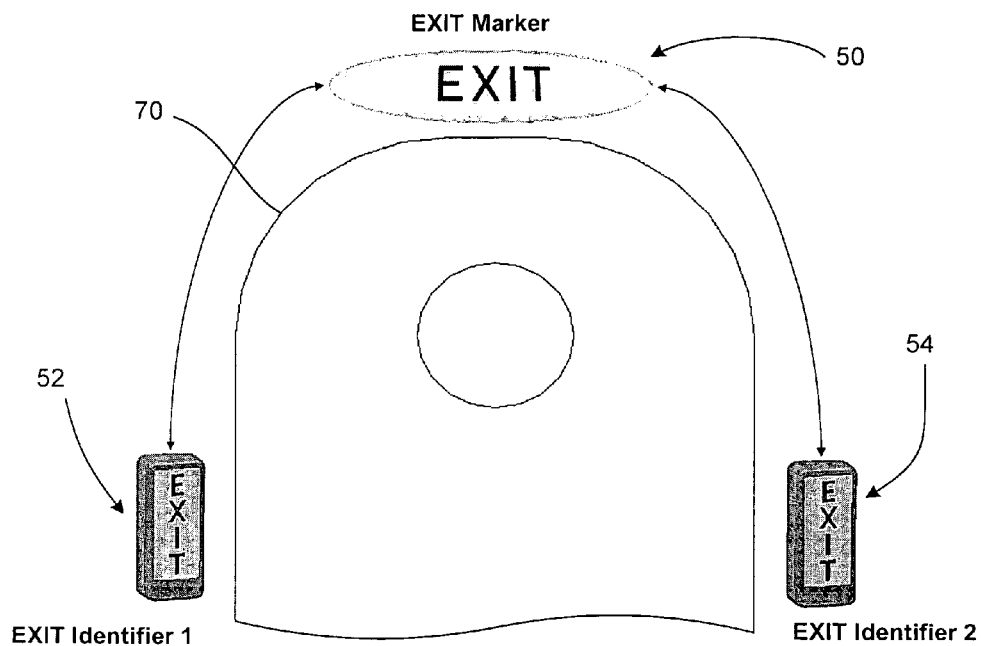
FIG. 10 is a diagrammatic illustration of an exemplary EXIT door installation of an EXIT marker with two EXIT identifiers for use in accordance with the present invention.

Referring now to FIG. 9, an exemplary aircraft layout, including emergency lighting locations, is provided. Typically, the WELS of an aircraft will include EXIT markers 50, EXIT locators 52, 54, emergency illumination 56 and floor proximity markers 60, 62. In addition to WELS, there are several lighting systems distributed throughout the aircraft cabin, including general illumination, wall wash, emergency and passenger service unit (PSU)/reading lights. In particular, the general illumination and emergency lighting systems are attractive candidates for wireless communications system micro-strip (planar) antennas, as are the fuselage windows. FIG. 9 shows that the aircraft's distributed system of lights offers a good, unobtrusive, opportunity to form a wireless network of communications devices. These lights (alone) represent a fixed set of points, defined by distance and direction, to relay communications to any point in the aircraft cabin. Further, FIG. 10 provides an exemplary arrangement of EXIT identifiers or locators 52, 54 in relation to an EXIT marker 50 adjacent an aircraft door 70.

To avoid interference, directional antennas can be used to establish predefined paths. Directivity of an antenna relates to how the field pattern can be designed to have areas of greater or less sensitivity. Further, when interference disrupts the communication, alternate paths can be mapped and implemented by making the antennas "smart" (i.e., dynamically changing directivity). To change directivity and or polarization, several antennas may be needed for each transmitter/receiver. Another method to avoid interference includes switching the modulation frequency (also referred to as channel diversity). For example IEEE 802.15.4 identifies 26 channels operating in the ISM (Industrial Scientific Medical) band. The "upper ISM" includes 16 of these channels, all of which can be served by a single antenna configuration (because the channel bandwidths and separations are relatively small). This method also involves adding a second antenna, but, in this case, the second antenna is of a different length (in accordance with integral $\frac{1}{4}\lambda$ length sections for that frequency). Given that micro-strip antennas are small in comparison to the light lenses, smart (multiple switched) antennas can be provided using either of the above-described antenna formation methods.

Figure 11:
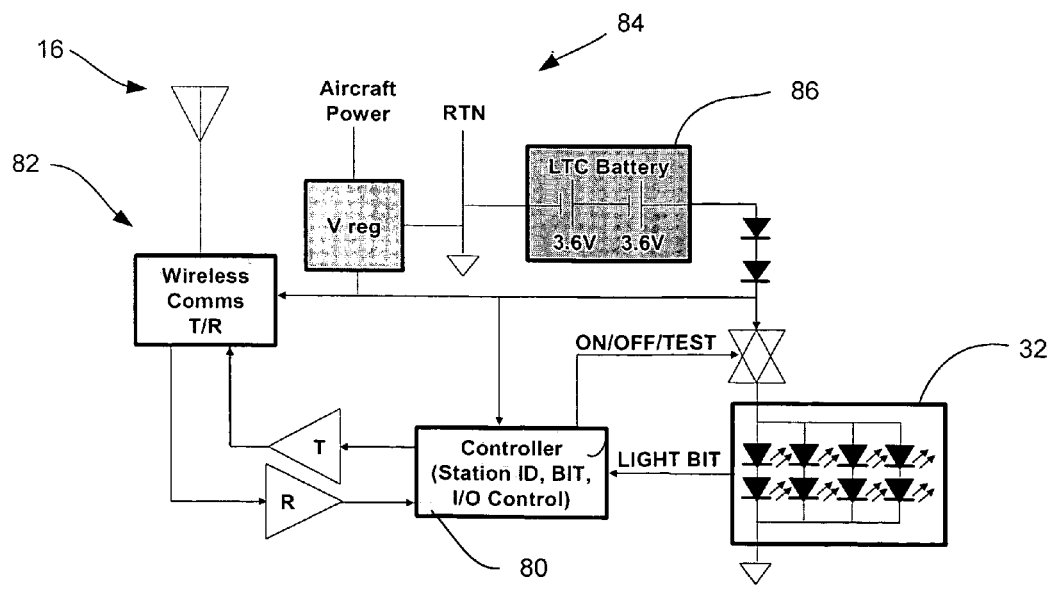
FIG. 11 is a schematic illustration of a light design for WELS EXIT locator and general illumination light assemblies in accordance with the present invention.
Figure 12:
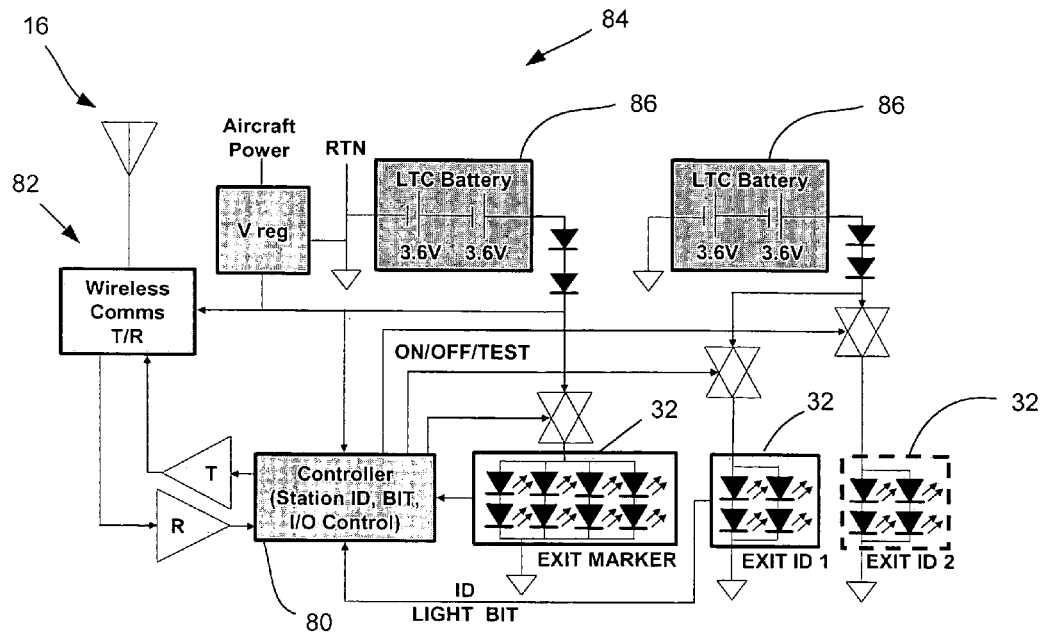
FIG. 12 is a schematic illustration of a light design for WELS EXIT marker and EXIT identifier light assemblies in accordance with the present invention.
Figure 13:
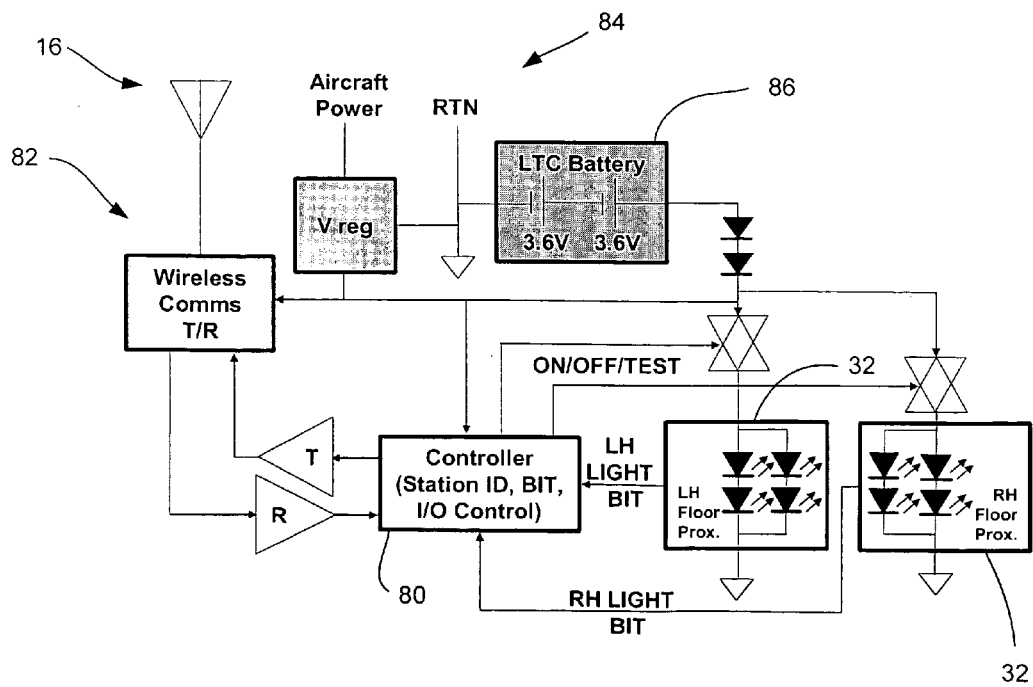
FIG. 13 is a schematic illustration of a light design for WELS floor proximity emergency light assemblies in accordance with the present invention.
Figure 14:
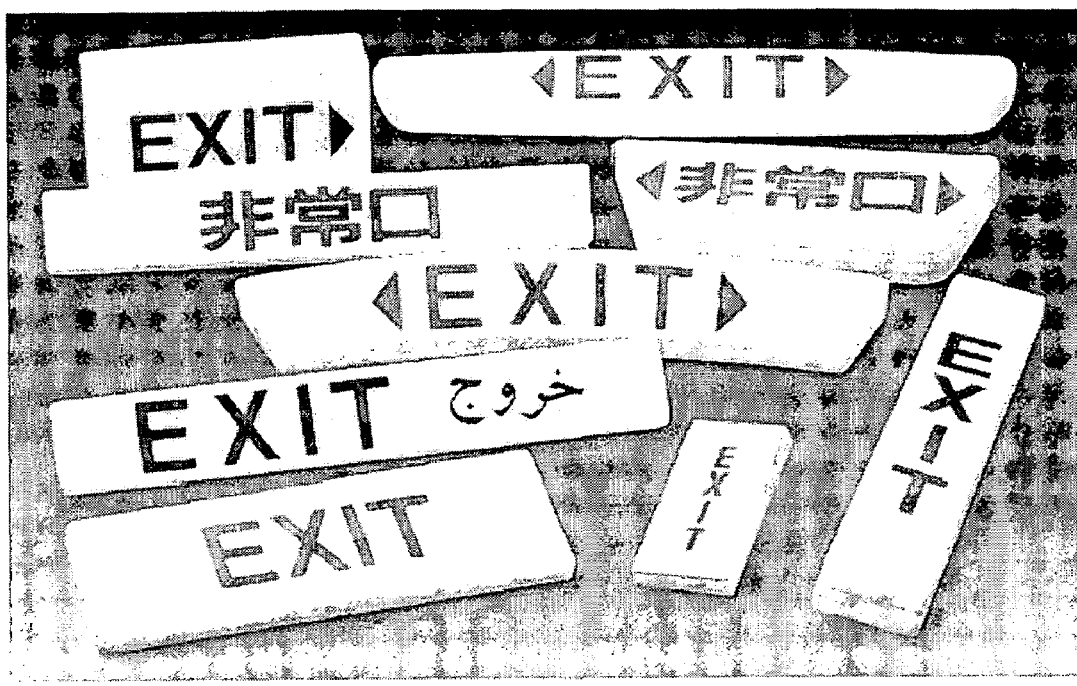
FIG. 14 illustrates several exemplary interior lighting assemblies for use in accordance with the present invention.
Figure 14:
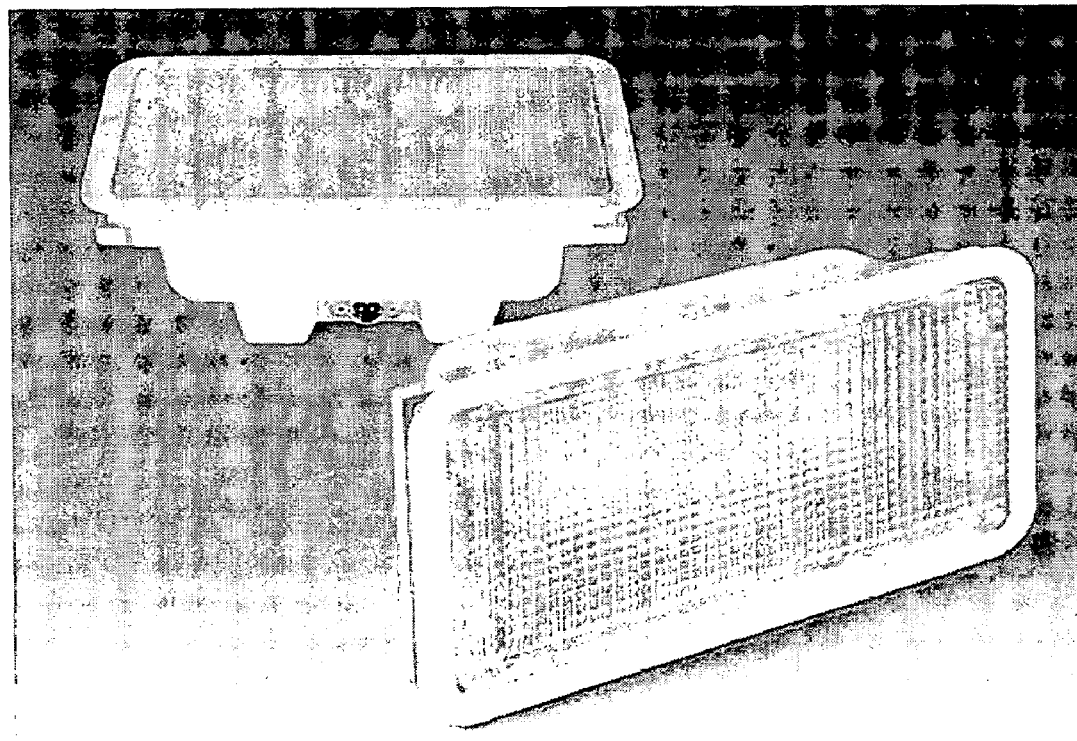

Referring now to FIGS. 11-13, schematic illustrations of various WELS light assemblies are provided. Throughout this description, like elements will be referred to using like reference numerals. FIG. 11 depicts a general light design for EXIT locator and general illumination light assemblies; FIG. 12 depicts a general light design for EXIT marker and EXIT identifier light assemblies; and FIG. 13 depicts a general light design for floor proximity light assemblies. In addition, FIG. 14 depicts several exemplary light assemblies for use with the WELS.

In general, each light assembly includes one or more lighting elements 32 (e.g., LED light assembly), a controller 80, a wireless transceiver 82, including one or more antennae 16 and a power supply 84. In a preferred embodiment, power is supplied using the aircraft power (when available) for normal and maintenance operation. For un-powered conditions, (non-rechargeable) primary batteries 86 are used for back-up power.

The preferred batteries 86 are $Li/SOCl_2$, Lithium Thionyl Chloride (LTC), cells. Of all chemistries in the Lithium series, LTC batteries exhibit the highest energy density by volume (up to 1300 WHr/l) and by weight (up to 710 W/kg). The useful life of LTC exceeds 10 yrs and the self-discharge rate is less than 1%. LTC batteries are manufactured in hermetically seal (welded) cases. LTC batteries meet the −55° C. to +85° C. operating temperature range for aerospace applications.

LTC batteries are best suited for applications where there is a very low continuous current load and moderate pulse current requirements. The WELS has both of these operating characteristics. Low continuous current draw occurs during non-operating hours of the aircraft.

Configuration of the controller 80 for each light is generic and capable of performing all light functions until the time that it is installed into the light unit itself. At that time, and as part of acceptance testing, the light unit P/N and S/N are downloaded. The P/N alone, for the light, identifies the light function (e.g., distinguishes between marker, locator, proximity, etc. functions).

With exception to the light assembly (housing, LED and lens/reflector), common electronics assemblies are used throughout the WELS system of components. Each light uses the same battery P/N (2 each) except for the EXIT marker, which uses an extra pair of batteries to power slave units.

With specific reference to FIG. 13 and FIG. 10, the light circuit controller 80 operates a solid-state switch to turn the EXIT marker LEDs ON. This switch operates only when commanded by the WELS controller. The ON command is issued from the WELS controller either by control inputs from the flight deck (ON mode), control inputs and airplane status (ARM mode) or from the attendant display panel (test/maintenance mode).

Optionally, the slave unit EXIT identifiers can be made to pulse as a means to attract passenger attention. Separate solid-state switches independently control the EXIT identifiers. Pulsing (alternating or synchronized) the EXIT identifiers (either fully OFF/ON or DIM/Bright) in emergency operation is easily included in the controller configuration.

Referring back to FIGS. 1-4, like other WELS components, the WELS controller 12 will tap into the aircraft power system to minimize the battery capacity and weight requirements. With a developed interface specification between the WELS controller 12 and CSCS 20, it is possible to fully assess the battery requirements for the WELS controller 12. That is, the power requirement to operate the WELS controller is dependent upon, among other things, the transactions to the CSCS on RS-485 links during un-powered flight/emergency conditions. The controller, for example, does not have the luxury of a 'sleep' mode as the other WELS components do.

Other than the RS-485 interface to the CSCS and battery power requirement, the peer-to-peer nature of IEEE 802.15.4 essentially allows the WELS controller functions to be distributed among the other WELS components. As such, it is possible to designate two of the 'more permanent' (EXIT Door location—see FIG. 10, for example) WELS components as the WELS controller by providing them with the RS-485 interface to CSCS, additional energy storage capacity and virtual network construct. This option essentially eliminates two physical WELS components from the overall system.

The WELS Controller is preferably contained in an aluminum enclosure 4"×5"×2", a D38999 connector and four D-cell LTC batteries. A power supply/controller assembly with RF transceiver assembly similar to other WELS components is used along with an interface card (UART/RS-485 driver/receiver).

Although the invention has been shown and described with respect to certain embodiments, equivalent alterations and modifications will occur to others skilled in the art upon reading and understanding this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A wireless emergency lighting system (WELS) for an aircraft interior, the system comprising:
   a plurality of light assemblies locatable throughout the aircraft interior, each of the plurality of light assemblies including at least one wireless communication device; and
   a WELS controller for communicating wirelessly with one or more of the plurality of light assemblies,
   wherein each light assembly is in wireless communication with one or more other light assemblies via its at least one wireless communication device, and
   wherein the WELS controller communicates with a given light assembly along a given wireless communications path, and the WELS controller changes the wireless communications path between the controller and the given light assembly in response to a disruption of communication path between two light assemblies along the given wireless communications path.

2. The WELS of claim 1, wherein the at least one wireless communication device includes a radio frequency (RF) antenna.

3. The WELS of claim 2, wherein each light assembly includes a housing;
   one or more light generating elements mounted to the housing;
   a lens mounted on the front of the housing; and
   a radio frequency (RF) antenna disposed on or in the lens.

4. The WELS of claim 3, wherein the lens is comprised of a dielectric material and includes a front surface and a rear surface, the rear surface including a substantially translucent conductive coating and the front surface including a substantially translucent conductive antenna pattern.

5. The WELS of claim 3, wherein the lens includes a plurality of antennae on or in the lens.

6. The WELS of claim 5, wherein each of the plurality of antennae has a different directivity and/or polarization.

7. The WELS of claim 6, wherein each light assembly is switchable between any of the plurality of antennae.

8. The WELS of claim 6, wherein each light assembly is switchable between any of the plurality of antennae to optimize received signal strength.

9. The WELS of claim 1, wherein the WELS controller is in data communication with a cabin services communications system (CSCS).

10. The WELS of claim 1, wherein each light assembly includes a light assembly controller in wireless data communication with the WELS controller directly or through one or more other light assembly.

11. The WELS of claim 1, wherein the plurality of light assemblies are interior emergency lights.

12. A lighting device comprising:
   a housing;
   one or more light generating elements mounted to the housing;
   a wireless communication device mounted to the housing, and
   a lens mounted on the front of the housing, the lens including a radio frequency (RF) antenna disposed integrally with the lens, the lighting device being located within the interior of an aircraft, wherein the lens is comprised of a dielectric material and includes a front surface and a rear surface, the rear surface including a substantially translucent electrical conducting coating and the front surface including a substantially translucent conductive antenna pattern.

13. The device of claim 12, wherein the substantially translucent conductive coating is indium-tin-oxide (ITO).

14. The device of claim 12, wherein the lens further includes a transmission line in data communication with the RF antenna.

15. The device of claim 12, wherein the lens includes a plurality of antennae on or in the lens.

16. The device of claim 15, wherein each of the plurality of antennae has a different directivity and/or polarization.

17. The device of claim 15, wherein the lens includes a pair of antennae operable at different modulation frequencies.

18. The device of claim 15, wherein the lens includes an antenna operable at difference modulation frequencies.

19. The device of claim 12, wherein the lens is an EXIT sign lens.

20. The device of claim 12, wherein the light generating elements are light emitting diodes (LEDs).

21. A wireless communications system for an aircraft interior, the system comprising:
   a plurality of devices locatable throughout the aircraft interior, each of the plurality of devices including at least one wireless communication device;
   a controller in wireless communication with one or more of the plurality of devices;
   wherein the controller communicates with a given device along a given wireless communications path, and the controller changes the wireless communications path between the controller and the given device in response to a disruption of communication path between two devices along the given wireless communications path.

* * * * *